(12) United States Patent
Manjure et al.

(10) Patent No.: US 11,905,407 B2
(45) Date of Patent: Feb. 20, 2024

(54) POLYLACTIDE-BASED MASTERBATCH, FOR A COMMERCIALLY VIABLE SINGLE-STEP IN-MOLD ANNEALING INJECTION MOLDING PROCESS

(71) Applicant: NORTHERN TECHNOLOGIES INTERNATIONAL CORPORATION, Beachwood, OH (US)

(72) Inventors: Shilpa Manjure, Woodbury, MN (US); Nagaraj Kuppusamy, Tamil Nadu (IN); Matthew Lundblad, Woodbury, MN (US)

(73) Assignee: Northern Technologies International Corporation, Beachwood, OH (US)

( * ) Notice: Subject to any disclaimer, the term of this patent is extended or adjusted under 35 U.S.C. 154(b) by 327 days.

(21) Appl. No.: 17/604,103

(22) PCT Filed: May 13, 2020

(86) PCT No.: PCT/US2020/032572
§ 371 (c)(1),
(2) Date: Oct. 15, 2021

(87) PCT Pub. No.: WO2020/236467
PCT Pub. Date: Nov. 26, 2020

(65) Prior Publication Data
US 2022/0204755 A1 Jun. 30, 2022

Related U.S. Application Data (60) Provisional application No. 62/849,214, filed on May 17, 2019.

(51) Int. Cl.
| | | |
|---|---|---|
| C08J 3/22 | (2006.01) |
| C08K 3/22 | (2006.01) |
| C08K 3/34 | (2006.01) |
| C08K 5/42 | (2006.01) |
| C08K 5/53 | (2006.01) |
| C08L 67/02 | (2006.01) |
| C08L 67/04 | (2006.01) |
| B29C 45/00 | (2006.01) |
| B29C 71/02 | (2006.01) |
| B29K 67/00 | (2006.01) |

(Continued)

(52) U.S. Cl.
CPC .......... C08L 67/04 (2013.01); B29C 45/0001 (2013.01); B29C 45/0013 (2013.01); B29C 71/02 (2013.01); C08J 3/226 (2013.01); C08K 3/346 (2013.01); B29C 2071/022 (2013.01); B29K 2067/006 (2013.01); B29K 2067/046 (2013.01); B29K 2509/00 (2013.01); B29L 2031/286 (2013.01); C08J 2367/04 (2013.01); C08J 2467/02 (2013.01); C08K 2003/2217 (2013.01); C08L 2203/30 (2013.01); C08L 2205/025 (2013.01); C08L 2205/24 (2013.01); C08L 2310/00 (2013.01)

(58) Field of Classification Search
CPC ............ B29C 45/0001; B29C 45/0013; B29C 2071/022; B29K 2067/006; B29K 2067/046; B29K 2509/00; C08J 3/22; C08J 3/226; C08J 2367/04; C08J 2467/02; C08K 3/22; C08K 2003/2217; C08K 3/34; C08K 3/346; C08K 5/42; C08K 5/53; C08L 67/02; C08L 67/04; C08L 2205/025; C08L 2205/24; C08L 2310/00
USPC ...... 264/235, 328.1, 328.17, 328.18, 331.11, 264/331.21; 523/351; 524/433, 451, 524/745; 525/411, 437
See application file for complete search history.

(56) References Cited

U.S. PATENT DOCUMENTS

| | | |
|---|---|---|
| 2008/0064812 A1 | 3/2008 | Narayan et al. |
| 2012/0041109 A1 | 2/2012 | Krishnaswamy |

(Continued)

FOREIGN PATENT DOCUMENTS

| | | |
|---|---|---|
| JP | 201593978 A | 5/2015 |
| WO | 9204413 A1 | 3/1992 |

(Continued)

OTHER PUBLICATIONS

Ferreira, An Overview on Properties and Applications of Poly(butylene adipate-co-terephthalate)-PBAT Based Composites, Polymer Engineering and Science, 2019, pp. E7-E15, DOI 10.1002/pen24770, Wiley Online Library.

(Continued)

*Primary Examiner* — Leo B Tentoni
(74) *Attorney, Agent, or Firm* — Hudak, Shunk & Farine Co. LPA (57) ABSTRACT

Polylactide (PLA) parts can be crystallized via two procedures. In the first procedure, i.e. a 2-step post-mold annealing process, the complete crystallization of PLA parts can be done after molding in a secondary operation called as post-mold annealing to make higher heat-resistant PLA parts. There are limitations to this 2-step operation, namely, a) warpage of parts with complex geometries, and b) scaling up higher production volume times. In the second procedure, i.e. 1-step in-mold annealing process, the complete crystallization of PLA parts can be done in the mold itself by holding the temperature of the mold at the crystallization temperature of PLA which is about 100° C. The 1-step in-mold annealing process using a masterbatch blended with neat PLA results in a highly crystalline article produced in a significantly lower cycle time.

20 Claims, 4 Drawing Sheets

(51) Int. Cl.
     *B29L 31/28*      (2006.01)
     *B29K 509/00*     (2006.01)

(56) References Cited

U.S. PATENT DOCUMENTS

| | | |
|---|---|---|
| 2015/0031802 A1 | 1/2015 | Marini et al. |
| 2016/0177086 A1* | 6/2016 | Marini .................. C08L 67/04 |
| | | 524/451 |
| 2018/0118936 A1* | 5/2018 | Nelson .................. C08L 67/04 |

FOREIGN PATENT DOCUMENTS

| | | |
|---|---|---|
| WO | 2011085058 A1 | 7/2011 |
| WO | 2015057694 A2 | 4/2015 |

OTHER PUBLICATIONS

Nagarajan, Overcoming the Fundamental Challenges in Improving the Impact Strength and Crystallinity of PLA Biocomposites: Influence of Nucleating Agent and Mold Temperature, ACS Applied Materials & Interfaces, 2015, pp. 11203-11214, vol. 7, No. 21, XP055978001, DOI: 10.1021/acsami5b01145, ACS Publications.
Randal, New Ingeo products offer structure and property capabilities that enhance performance in fiber/nonwovens, Injection molding and durables markets, NatureWorks LLC, Innovation Takes Root Jan. 1, 2012, pp. 1-42, XP055977980.

* cited by examiner

POLYLACTIDE-BASED MASTERBATCH, FOR A COMMERCIALLY VIABLE SINGLE-STEP IN-MOLD ANNEALING INJECTION MOLDING PROCESS

FIELD OF THE INVENTION

There are two ways in which polylactide (PLA) parts can be completely crystallized. In the first procedure, i.e. a 2-step post-mold annealing process, the complete crystallization of PLA parts can be done after molding in a secondary operation called as post-mold annealing to make higher heat-resistant PLA parts. There are limitations to this 2-step operation, namely, a) warpage of parts with complex geometries, and b) scaling up higher production volume times. In the second procedure, i.e. 1-step in-mold annealing process, the complete crystallization of PLA parts can be done in the mold itself by holding the temperature of the mold at the crystallization temperature of PLA which is about 100° C. Warpage is significantly reduced in this 1-step in-mold annealing process and handling of parts is also limited. PLA, however, has a slow crystallization rate at its peak crystallization temperature of about 100° C. as compared to other thermoplastics, which significantly increases injection molding cycle times. The 1-step in-mold annealing process, until now, has NOT been commercially viable due to prohibitively long cycle times of the order of 50-70 seconds in the injection molding process of standard 5 gram article.

BACKGROUND OF THE INVENTION

Molding polylactide (PLA) at or below about 70° C. to about 80° C. yields an article having very low crystallinity or crystalline domains. As a result of having higher amorphous domains in the polymer with a glass transition temperature of about 55° C., the part softens above about 55° C. This fact is one of the biggest drawbacks of low commercial sales of PLA, especially in high-heat foodservice applications such as compostable single-use cutlery (throw-away) and other compostable molded articles. As such, a PLA compounded with additives that increase its crystallinity and improve its heat deflection (distortion) temperature without affecting its compostability is sought.

SUMMARY OF THE INVENTION

A masterbatch resin has been developed that can be blended with a neat PLA resin to give high heat resistant crystalline PLA cutlery with improved toughness and performance properties. Most importantly, the cycle times have been reduced to 25-35 seconds resulting in a 1-step in-mold annealing process with respect to a 5 gram article that is economically viable.

The masterbatch comprises a polylactide having a low d-content of from about 0.2% to about 2.5% blended with an inorganic filler such as talc and a compostable random copolyester. This masterbatch blended with a neat PLA provided faster crystallization rates and significantly lower cycle times of about 35% to about 60% for the 1-step in-mold annealing process compared to the 2-step post-mold annealing process for the same composition and the part weight. In the 1-step in-mold annealing process, annealing was carried inside a mold where the mold was held at the crystallization temperature of PLA of about 100° C. This exceptional improvement of the 1-step in-mold annealing injection molding process provided an economically viable and heat resistant crystalline PLA cutlery.

A process comprising a 1-step in-mold annealing of a polymer blend, and forming an article, said polymer blend comprising parts A and B, A) a neat polylactide resin having weight average molecular weight of from about 110,000 g/mol to about 175,000 g/mol, said neat polylactide resin having a d-content (dextrorotatory content) of from about 0.2% to about 1.0%, and B) from about 10 parts to about 100 parts by weight of a masterbatch, masterbatch comprising from about 15 wt. % to about 50 wt. % of a polylactide resin having a weight average molecular weight of from about 110,000 to about 175,000, and about 30 wt. % to about 70 wt. % of a crystallization aid compound, and from about 0 wt. % to about 30 wt. % of a compostable random copolyester.

BRIEF DESCRIPTION OF THE DRAWINGS

FIG. 4 (a)-(c) show filler variation from cavity to cavity of the cutlery pieces molded on the 32-cavity tool using 1-step in-mold annealing process with the formulation EXAMPLE B.

DETAILED DESCRIPTION OF THE INVENTION

The short injection molding cycle time of a polylactide article of the present invention for various end-use applications including cutlery was achieved by blending two parts, a neat polylactide resin, and a masterbatch comprising a polylactide, a crystallization aid compound, and a random copolyester. The initial polylactide to which the masterbatch is added, herein after will be referred to as a neat polylactide resin in order to distinguish it from a polylactide utilized in the masterbatch. The neat polylactide resin is relatively pure, that is contains no contaminates or other polymers therein. Thus, it generally contains less than about 1 wt. % of any contaminate, desirably less than about 0.5 wt. %, and preferably less than about 0.1 wt. % or nil, i.e. no contaminate or different compound therein.

The neat polylactide resins have a number average molecular weight of from about 50,000 g/mol to about 150,000 g/mol, desirably from about 60,000 g/mol to about 120,000 g/mol, and preferably from about 60,000 g/mol to about 100,000 g/mol, and a weight average molecular weight of from about 110,000 g/mol to about 175,000 g/mol, desirably from about 115,000 g/mol to about 150,000 g/mol, and preferably from about 125,000 g/mol to about 140,000 g/mol. The various neat polylactide resins are classified by the d content that represents the amount of dextrorotatory stereoisomer in PLA resins. The neat polylactide resins of the present invention have a d-content of from about 0.2% to about 1.0%, desirably from about 0.2% to about 0.8%, and preferably from about 0.2% to about 0.6%. Such neat polylactide resins can generally be obtained from several corporations such as NatureWorks, USA and Total Corbion, NL.

The masterbatch component of the composition generally contains a total of from about 10 to about 100 parts by weight, desirably from about 20 to about 50 parts by weight, and preferably from about 30 to about 40 parts by weight for every 100 parts by weight of the neat polylactide resin. As noted above, the masterbatch of the present invention desirably comprises a polylactide, a crystallization aid compound, and a compostable random polyester compound. The number average molecular weight of the masterbatch polylactide is from about 50,000 g/mol to about 150,000 g/mol, desirably from about 60,000 g/mol to about 120,000 g/mol, and preferably from about 60,000 g/mol to about 100,000 g/mol, and the weight average molecular weight of the masterbatch polylactide is from about 110,000 g/mol to about 175,000 g/mol, desirably from about 115,000 g/mol to about 150,000 g/mol, and preferably from about 125,000 g/mol to about 140,000 g/mol. The masterbatch polylactide based resin has a d-content of from about 0.2% to about 2.5%, desirable from about 0.2% to about 2.0%, and preferably from about 0.2% to about 1.0%. Such polylactides can also be readily obtained from the same source as the above-noted neat polylactide resin. The amount of the masterbatch polylactide is generally from about 15 wt. % to about 50 wt. %, desirably from about 15 wt. % to about 35 wt. %, and preferably from about 20 wt. % to about 30 wt. % based upon the total weight of the masterbatch.

An important aspect of the present invention is the utilization of a crystallization aid compound in the masterbatch to achieve high crystallinity in the final, 1-step injection molded article. Suitable crystallization aid compounds include various nucleating agents such as salts of sulphonates or phosphonates or silicates. A preferred crystallization aid compound of the present invention is talc that is a naturally occurring hydrous magnesium silicate. The amount of the crystallization aid compound such as talc can vary from about 30 wt. % to about 70 wt. %, desirably from about 40 wt. % to about 60 wt. %, and preferably from about 50 wt. % to about 60 wt. %, based upon the total weight of the masterbatch. The average particle size of the crystallization aid compound such as talc is generally from about 1 to about 5 microns and preferably is from about 2 to about 3 microns. Another aspect of the present invention is to achieve higher crystallinity with the 1-step injection molding process with utilization of one or more compostable random copolyesters in the masterbatch. The amount of these compounds is generally from about 0 wt. % to about 30 wt. %, desirably from about 5 wt. % to about 30 wt. % or from about 5 wt. % to about 25 wt. %, and preferably from about 5 wt. % to about 20 wt. % based upon the total weight of the masterbatch. Different types of random copolyesters are commercially available and generally have the formula, Wherein, x, independently, is an integer of from about 2 to about 10, or about 34 (dimer fatty acid), wherein, y, independently, is an integer of from 2 to about 8.

Desirably, —(CH$_2$)$_x$— can be derived from an adipic acid, sebacic acid, azelaic acid, or succinic acid and —(CH$_2$)$_y$— can be derived from 1,4-butanediol or ethylene glycol. Examples of suitable compostable random copolyesters include polybutylene succinate-co-adipate (PBSA), polybutylene sebacate-co-terephthalate (PBST), with polybutylene adipate-co-terephthalate (PBAT) being preferred. The weight average molecular weight of the one or more random copolyesters, independently, can range from about 80,000 g/mol to about 175, 000 g/mol with a desirable weight average molecular weight being from about 90,000 g/mol to about 150,000 g/mol and preferably from about 100,000 g/mol to about 130,000 g/mol.

The general mixing procedure with regard to compounding the various components of the masterbatch is achieved by pre-mixing the crystallization aid compounds such has talc, the polylactide, and the compostable polyester at room temperature, and then melt blend it in a twin-screw extruder or a continuous mixer, or any other conventional melt blending device, until generally a homogeneous composition is obtained. The melt compounding of the masterbatch is generally carried out at a temperature from about 140° C. to about 220° C., desirably from about 150° C. to about 190° C., and preferably from about 165° C. to about 190° C. The blended masterbatch is then mixed with the neat polylactide resin in any conventional manner or in any physical blending device and mixed for a suitable amount of time (10-20 minutes) until a generally homogeneous distribution or composition is obtained. The physical blending temperature for mixing the masterbatch with the neat polylactide is generally at room temperature as from about 15° C. to about 40° C. desirably from about 20° C. to about 30° C., and preferably from about 23° C. to about 27° C. According to the present invention, it has been found that the unique composition of the masterbatch can be melt blended with the neat polylactide resin in a 1-step or single-step in-mold annealing process wherein the mold is held at a crystallization temperature of PLA of from about 90° C. to about 110° C., desirably from about 95° C. to about 105° C., and preferably from about 95° C. to about 100° C. An in-mold injection molding process is preferred. The definition of the 1-step in-mold annealing process of the present invention is defined as follows: In the 1-step in-mold annealing process, the PLA based articles having a good amount of crystallinity and high-heat performance are injection molded in a mold and the same mold is then, or subsequently, is held at a crystallization temperature of from about 90° C. to about 110° C., whereby crystallization of the PLA article is greatly increased. In the 2-step post-mold annealing process of the prior art is defined as follows: In the 2-step post-mold annealing process, the PLA based articles are injection molded with a mold held at room temperature, yielding low crystallinity articles in the first step. These articles are kept in an oven held at about 100° C. for annealing to produce articles with high crystallinity and high heat performance, in the second step.

Suitable produced articles include a coffee stirrer, a hot coffee cup or a hot coffee lid, etc., with cutlery articles being preferred such as a fork, spoon, knife, etc. The cycle time is defined as the total time needed to mold and anneal the article. In the case of 1-step process, cycle time will be the addition of injection time, fill time, pack and hold time, and cooling time. In the case of 2-step process, cycle time will be the addition of molding time per shot (injection time+fill time+pack and hold time) and annealing time in an oven for crystallization. The molding cycle time will vary with the weight and thickness of the article being made. That is, molding of lower weight and thinner articles will be faster and will have lower cycle time, whereas molding of heavier and thicker articles will be comparatively slower and will have a longer cycle time. The above described 1-step in-mold annealing process of the unique blend compositions of the present invention, with respect to an article having 5 gram weight and thickness less than or equal to 2 mm article, unexpectedly yielded reduced cycle times of approximately 30% to about 70%, desirably from about 45% to 60%, and preferably from about 45% to about 55% of the heretofore 2-step post-mold annealing process wherein the same composition was used. In the 1-step in-mold annealing process, cycle times for a 5 gram article of the present invention is generally from about 20 seconds to about 45 or 50 seconds, desirably from about 25 seconds to about 35 seconds, and preferably from about 25 seconds to about 30 seconds. Moreover, the final polymer blend containing neat polylactides and masterbatch of the present invention, in addition to rapid in-mold cycle times have a high degree of crystallinity such as at least about 40%, desirably at least about 45%, and often 50% or higher.

Experimental:

Compounding: The masterbatch MB-1 was compounded using a formulation of 10 wt. % of talc (crystallization aid compound) and 90 wt. % of PLA (d-content of 0.5%-PLAD0). The masterbatch MB-2 was compounded using a formulation of 60 wt. % of talc (crystallization aid compound), 25 wt. % of PLA (d-content of 1.2-2.5%-PLAD1), and 15 wt. % of PBAT (a random copolyester). During compounding, the barrel temperatures were maintained at 165° C.-190° C., extruder screw speed was about 30 rpm, and the output was 500 kg/hr. Samples were collected in the beginning, middle, and end of each extrusion run and analyzed for the consistency.

Injection molding of cutlery was carried out using a Sumitomo 350 ton, 32 cavity fully hot-runner cutlery molds (fork, spoon, and knife with part weights about 5 gm). Forks, spoons, and knives were molded in a 1-step in-mold annealing process using formulation EXAMPLE B given in Table 1. The mold temperature controller was set to 103° C. for crystallizing the pieces. Barrel temperatures for the molding were set at 180° C. to 200° C. and hot-runners were set at about 190° C. The cycle times for fork, spoon, and knife in this 1-step in-mold annealing molding process were determined.

Injection molding of test bars was carried out using a Toshiba EC85SX with an ASTM test bar mold. The formulations EXAMPLE A, EXAMPLE B, and EXAMPLE C given in Table 1 were used to make test bars using 1-step in-mold annealing processes. In this process, the mold was maintained at the crystallization temperature of about 100° C., and the cycle time was around 80 s for a 3 mm thick test bar. The formulations EXAMPLE A, EXAMPLE B, and EXAMPLE D given in Table 1 were used to make test bars using 2-step post-mold annealing processes. In this process, the mold was maintained at room temperature, and the cycle time (molding+post-mold annealing) was about 5 minutes. The flexural and the tensile test bars weight was 6.8 g and 10.7 g, respectively. The compounded masterbatches were blended physically with neat PLA in the proportion given in Table 1.

Table 1 below summarizes all the formulations that were injection molded either on a 32-cavity cutlery tool or on a test bar mold.

TABLE 1

Summary of injection molded formulations

| Examples | Parts by weight Neat PLA d = 0.5-2.5% | Parts by weight Masterbatch | Masterbatch Composition (wt. %) | | |
|---|---|---|---|---|---|
| | | | Polylactide d = 0.5-2.5% (wt. %) | Crystallization aid compound-Talc (wt. %) | Random copolyester-PBAT (wt. %) |
| Example A | 90 d = 0.5% | 10 (MB-1) | 90 wt. % d = 0.5% | 10 wt. % | None |
| Example B | 75 d = 0.5% | 25 (MB-2) | 25 wt. % d = 1.2-2.5% | 60 wt. % | 15 wt. % |
| Example C | 50 d = 0.5% | 50 (MB-2) | 25 wt. % d = 1.2-2.5% | 60 wt. % | 15 wt. % |
| Example D | 50 d = 1.2-2.5% | 50 (MB-2) | 25 wt.% d = 1.2-2.5% | 60 wt.% | 15 wt. % |

Characterization of masterbatches: The moisture content of the masterbatches was analyzed using Computrac Vapor Pro from Arizona Instruments. The density was determined using Quintix Analytical Balance 220 and in accordance with ASTM D792-13 (method A). The ash content (filler content) was determined by burning a sample in a muffle furnace at 550° C. for 30 minutes.

Characterization of Cutlery pieces: The filler content of the cutlery was determined by burning cutlery pieces at 550° C. for 30 minutes. The molded cutlery (5 gram) was also analyzed for the percent crystallinity using a differential scanning calorimeter, Discovery DSC (TA Instruments, USA). A sample of 10-15 mg was heated from 20° C. to 200° C. at a heating rate of 10° C./min under nitrogen atmosphere and thermal transitions observed on the first heating cycle was compared for all samples. The crystallinity was calculated according to the following formula, $$\text{Crystallinity}(\%) = \frac{\Delta H_m - \Delta H_{cc}}{w_f \Delta H_{m°}} \times 100$$

Where, $\Delta H_{cc}$ is enthalpy of cold crystallization, $\Delta H_m$ is enthalpy of melt crystallization, $w_f$ is the weight fraction of the PLA component, and $\Delta H_{m°}$ is enthalpy of melting of 100% crystalline PLA (J/g) which is 93.7 J/g, based on the literature.

Strength of cutlery was measured using an in-house test developed using Instron equipment called the rigidity test as set forth in S. Manjure M. Annan, Injection Molding of PLA Cutlery, Bioplastics Magazine, March 2016, Volume 11, hereby fully incorporated by reference. In this test, the handle of a cutlery piece was clamped to the upper jaw of the Instron and pushed down vertically until it was bent or broken. The force (compressive load) to break/bend a cutlery, and the distance travelled by the Instron upper jaw before the cutlery failed were recorded. The area under the curve of force versus distance represents the toughness of part (or energy to break, N-mm), and was recorded.

Characterization of test bars: The tensile and flexural testing was carried using an Instron model 3345B (Massachusetts, USA) with a mechanical testing fixture setup with a 5 kN load cell. The testing was carried out in accordance with ASTM D638-14 (Type I sample size) standard test methods for tensile properties (tensile strength, elongation at break, Young's modulus) of plastics. The rate of grip separation was set at 5 mm/min according to the ASTM D638 standard. The flexural testing was carried out in accordance with the ASTM D790-17 standard test methods for the flexural properties of unreinforced plastics and electrical insulating materials. The support span length was 50 mm and the rate of the crosshead motion was 1.35 mm/min. The notched Izod impact properties were studied using a Tinius Olsen Model IT504 (Tinius Olsen, USA) pendulum impact tester equipped with a Tinius Olsen Model Impact 104 test controller. The testing was carried out in accordance with the ASTM D256 standard test method for determining the Izod pendulum impact resistance of plastics. The samples were notched using a Tinius Olsen Model 899 Specimen Notcher. The test specimen had dimension 63 mm×12.7 mm×3.18 mm, and the notch was 2.54 mm deep. A minimum of five replicates were used to ensure the repeatability of the test data.

Results and Discussion:

Compounding: Properties of masterbatches MB-1 and MB-2 compounded in a continuous mixer are summarized in Table 2 below. The moisture content was below 0.1%. The ash content was measured to be very consistent and close to the target of 10% (MB-1) and 60% (MB-2).

TABLE 2

Properties measured on compounded masterbatches (MB-1 and MB -2)

| Masterbatch | Moisture Content (%) | Filler Content (%) | Density (g/cm³) |
|---|---|---|---|
| MB-1 | 0.06 ± 0.01 | 10.30 ± 0.50 | 1.32 ± 0.01 |
| MB-2 | 0.06 ± 0.01 | 59.60 ± 0.40 | 1.74 ± 0.01 |

Injection Molding—Cutlery Production Tools

Figure 1:
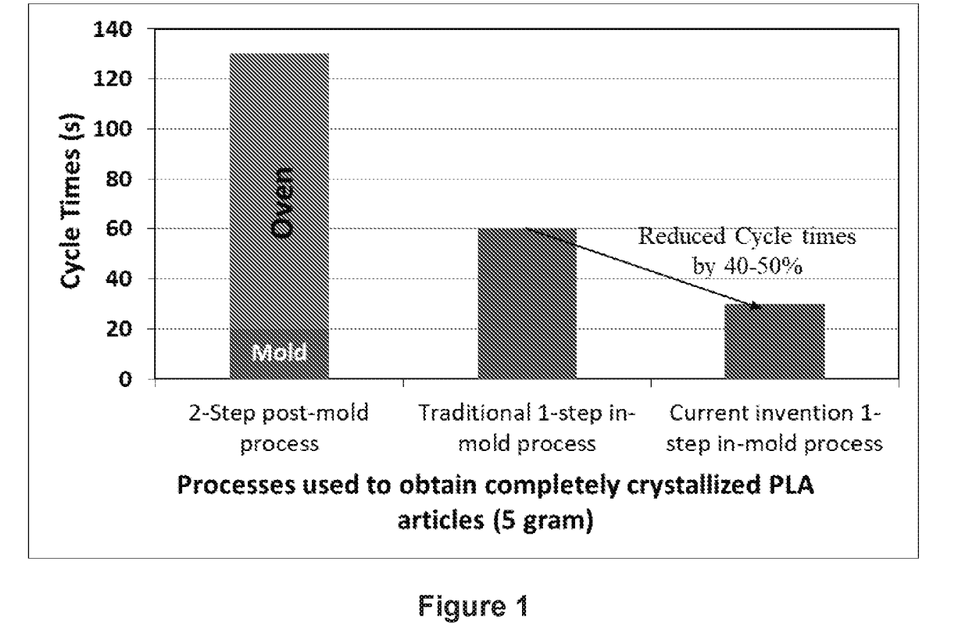
FIG. 1 shows a comparison of cycle times of various technologies (processes) used to obtain a completely crystallized PLA article (5 gram) including the method of the present invention.

As summarized previously, injection molding of PLA to produce high heat performance parts has been commonly done by annealing them in a secondary operation after molding with the parts held at a crystallization temperatures of about 100° C. for 1-2 minutes. FIG. 1 shows a comparison of cycle times for completely crystallized PLA articles (5 gram) via a 2-step post-mold annealing process, traditional 1-step in-mold annealing process, and 1-step in-mold annealing process obtained by inventors of the present invention. As summarized, the inventors of this application were able to completely crystallize PLA articles weighing 5 grams using the 1-step in-mold annealing process while reducing the cycle times by at least 40-50% compared to the traditional 1-step in-mold annealing process.

Figure 2:
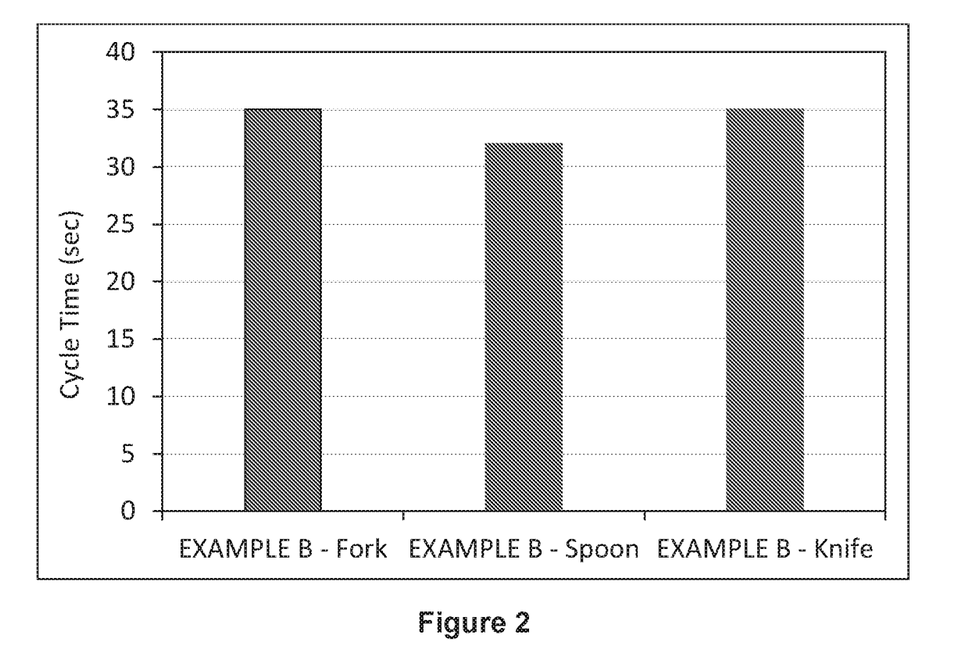
FIG. 2 shows the cycle times for injection molding of fork, spoon, and knife on a 32-cavity tool using the 1-step in-mold annealing process with the formulation EXAMPLE B of the present invention.

Forks, spoons, and knives were molded in a 1-step in-mold annealing process using formulation EXAMPLE B on 32 cavity tools. Cycle times for fork, spoon, and knife in this 1-step in-mold annealing molding process were 35, 32, and 35 seconds, respectively (See FIG. 2).

Figure 3:
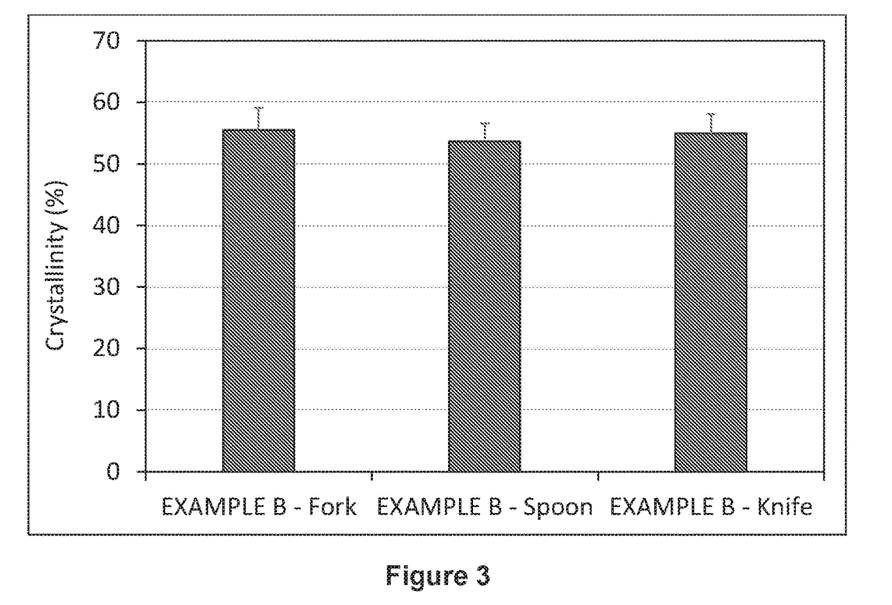
FIG. 3 shows that the average percent crystallinity of fork, spoon, and knife obtained using the 1-step in-mold annealing process with the formulation EXAMPLE B of the present invention is greater than 50%.
Figure 4:
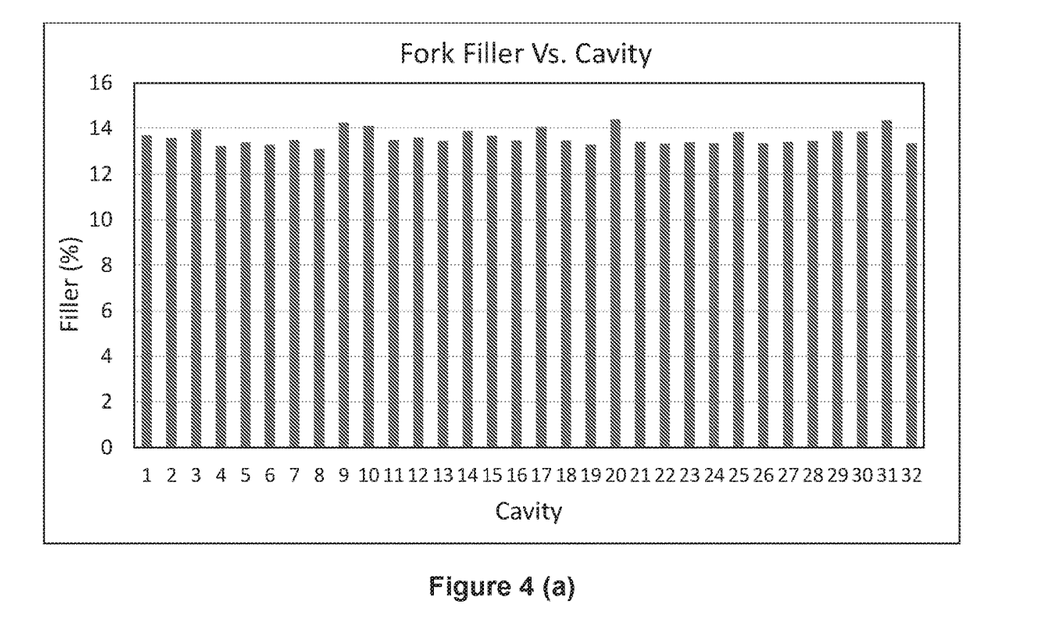

These cutlery pieces were measured for consistency and performance. FIG. 3 shows average crystallinity of fork, spoon, and knives, and FIG. 4(a-c) shows filler content of these parts for each cavity.

The crystallinity test was conducted generally in accordance with ASTM F2625-10 (reapproved 2016). Such test is generally known to the literature and to those skilled in the art. The method for determination of the crystallinity of PLA is similar. While the formula and heat of fusion are slightly different for PLA, such information is primarily set forth in the article WU et al, Simultaneous the thermodynamics favorable compatibility and morphology to achieve excellent comprehensive mechanics in PLA/OBC blend, Polymer, Vol. 55, 2014, pp. 6409-6417, Elsevier Ltd., especially on page 2, Paragraph 2.3, hereby fully incorporated by reference and is as follows.

DSC measurements were performed on a Perkin-Elmer pyris-1 DSC instrument in nitrogen atmosphere. The instrument was calibrated prior to testing by indium. Samples (about 5 mg) cut from the center of the molded bar were heated from 30° C. to 210° C. at a speed of 10° C./min to record the melt curves. Crystallinity of PLA ($X_{c,PLA}$) was evaluated as follows:

$$X_{C,PLA} = \frac{\Delta H_m - \Delta H_c - \Delta H_t}{w_f \Delta H_m^0}$$

where, $\Delta H_m$, $\Delta H_c$, and $\Delta H_t$ represent the enthalpies of melting, cold crystallization, crystalline phase transition of PLA, respectively. $\Delta H_m^0$ is the melting enthalpy of 100% crystalline PLA, which was reported to be 93.7 J/g. $w_f$ is the weight fraction of the PLA component.

All forks, spoons, and knives were found to be completely crystallized based on the DSC data at cycle time as low as 32 seconds with average crystallinities between 50-60% as shown in FIG. 3.

FIGS. 4(a)-4(c) were obtained by burning one shot from each cavity from each tool in a muffle furnace to measure ash content. Average filler content of forks, spoons, and knives was found to be 13.6%, 16.9%, and 17.8%, respectively, with standard deviations at 0.35%, 0.75%, and 0.63%, respectively. This demonstrated that the cavity to cavity variation was not significant. The deviation from target weight percent (15 wt. %) for each shot was attributed to uneven mixing of the highly filled masterbatch with neat PLA in the injection molding screw.

Figure 5:
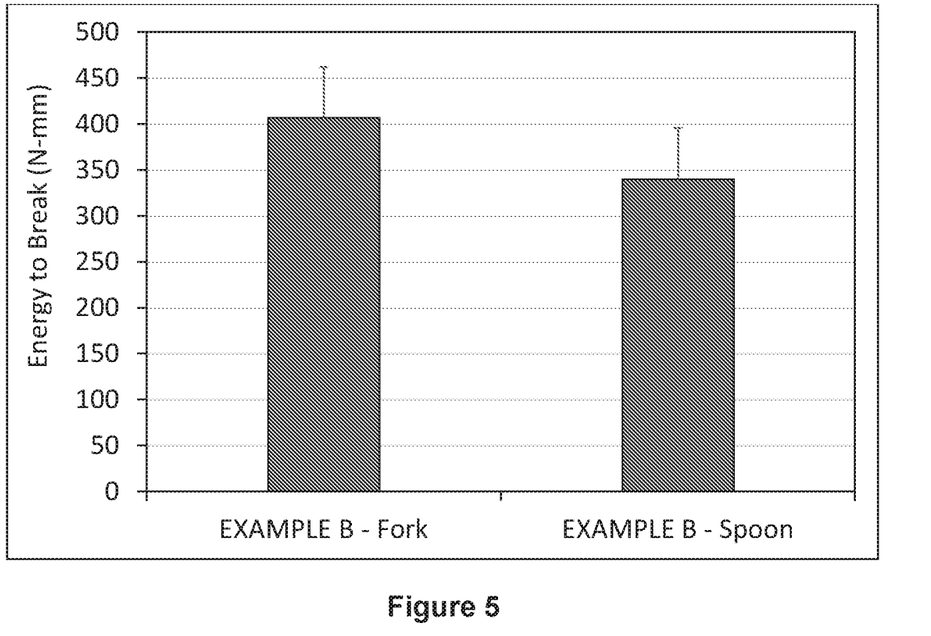
FIG. 5 shows energy to break (N-mm) for a cutlery as measured using an in-house rigidity test.

Performance of forks and spoons made with blend EXAMPLE B was measured using an in-house rigidity test. FIG. 5 shows results of the energy to break or toughness. Average toughness for spoon was 340 N-mm and that for fork was 407 N-mm.

Injection molding—Molded flexural and tensile test bars were 3 mm thick and weighing 6.8 grams and 10.7 grams, respectively.

The formulations EXAMPLE A, EXAMPLE B, and EXAMPLE C given in Table 1 were used to make test bars using 1-step in-mold annealing processes. With this process, a completely crystallized 3 mm thick test bar can be obtained with a cycle time of as low as 45-70 s (the cycle time for a 1.5 mm thick cutlery made using 1-step in-mold annealing process was about 34 seconds). The formulations EXAMPLE A, EXAMPLE B, and EXAMPLE D given in Table 1 were used to make test bars using 2-step post-mold annealing processes. With this process, the cycle time (molding+post-mold annealing) to obtain a completely crystallized 3 mm thick test bar was greater than 120 s. These test bars were evaluated for tensile, flexural, and impact properties. The mechanical properties of test bars obtained using 1-step in-mold and 2-step post-mold annealing processes are given in Table 3 and Table 4.

The mechanical performance of the test bars made using 1-step in-mold and 2-step post-mold annealing processes for the formulation EXAMPLE B is slightly different. This could be due to difference in crystal type developed in the two processes.

TABLE 3

Mechanical properties of injection molded test bars - 1-step in-mold annealing process (Cycle time - 45-80 s)

| Sample | Maximum Tensile stress (MPa) | Elongation at Break (%) | Tensile Modulus (MPa) | Impact strength (kJ/m$^2$) | Flexural Modulus (MPa) |
|---|---|---|---|---|---|
| EXAMPLE A | 72.0 ± 0.4 | 8.3 ± 0.6 | 1669.5 ± 41.8 | 3.7 + 0.4 | 4361 ± 43 |
| EXAMPLE B | 65.3 ± 0.4 | 10.0 ± 0.7 | 2473.1 ± 62.9 | 5.6 + 1.1 | 6260 ± 96 |
| EXAMPLE C | 57.7 ± 0.5 | 5.4 ± 0.3 | 2875.5 ± 24.9 | 3.4 + 0.3 | 6933 ± 44 |

TABLE 4

Mechanical properties of injection molded test bars - 2-step post-mold annealing process (Cycle time = 120 s or longer)

| Sample | Maximum Tensile stress (MPa) | Elongation at Break (%) | Tensile Modulus (MPa) | Impact strength (kJ/m$^2$) | Flexural Modulus (MPa) |
|---|---|---|---|---|---|
| EXAMPLE A | 75.2 ± 0.7 | 7.5 ± 1.1 | 1751.6 ± 2.9 | 0.2 22.6 | 4383 + 49 |
| EXAMPLE B | 60.6 ± 1.2 | 7.4 ± 0.2 | 2009.1 ± 5.8 | 0.4 15.4 | 5090 + 72 |
| EXAMPLE D | 61.9 ± 0.5 | 7.4 ± 0.3 | 2629.2 ± 3.5 | 0.2 265.9 | 7437 + 377 |

In conclusion, high heat-resistant PLA article was made using a 1-step in-mold annealing process and a formulation (blend of a masterbatch and neat PLA), requiring lower cycle times compared to the traditional PLA article manufacturing process. This process will be economically viable for the large scale production of compostable PLA cutlery, or articles. The parts obtained from this process were consistent, fully crystallized, and met performance expectations.

While in accordance with the patent statutes, the best mode and preferred embodiment have been set forth, the scope of the invention is not limited thereto, but rather by the scope of the attached claims.

What is claimed is:

1. A process comprising:
    in-mold annealing in a 1-step a polymer blend and forming an article, said polymer blend comprising,
    a) 100 parts by weight of a neat polylactide resin having a weight average molecular weight of from about 110,000 to about 175,000, said neat polylactide resin having a d (dextrorotatory) content of from about 0.2% to about 1.0%, and
    b) from about 10 to about 100 parts by weight of a masterbatch, said masterbatch comprising from about 15 wt. % to about 50 wt. % of a polylactide resin having a weight average molecular weight of from about 110,000 to about 175,000, from about 30 wt. % to about 70 wt. % of a crystallization aid compound comprising a salt of a sulphonate, or a salt of a phosphonate or a salt of a silicate, from about 5 wt. % to about 30 wt. % of a compostable random copolyester, and wherein said cycle time to produce said article is from about 20 to about 50 seconds for a 5 gram molded article.

2. The process of claim 1, wherein said neat polylactide resin has a weight average molecular weight of from about 115,000 to about 150,000, wherein said polylactide of said masterbatch has a weight average molecular weight of from about 115,000 to about 150,000, and wherein said copolyester of said masterbatch has a weight average molecular weight of from about 80,000 to about 175,000; said masterbatch comprising from about 15 wt. % to about 35 wt. % of said polylactide, from about 40 wt. % to about 60 wt. % of said crystallization aid compound, and from about 5 wt. % to about 30 wt. % of said random copolyester, wherein the d-content of said neat polylactide is from about 0.2% to about 0.8%, and wherein the d-content of said masterbatch PLA is from about 0.2% to about 2.5%.

3. The process of claim 2, wherein said neat polylactide resin has a weight average molecular weight of from about 125,000 to about 140,000, wherein said polylactide of said masterbatch has a weight average molecular weight of from about 125,000 to about 140,000, and wherein said copolyester of said masterbatch has a weight average molecular weight of from about 90,000 to about 150,000; wherein from about 30 to about 40 parts by weight of said masterbatch; wherein said masterbatch comprises from about 20 wt. % to about 30 wt. % of said polylactide, from about 50 wt. % to about 60 wt. % of said crystallization aid compound comprising talc, and from about 5 wt. % to about 20 wt. % of said random copolyester; wherein the d-content of said neat polylactide is from about 0.2% to about 0.6%, and wherein the d-content of said masterbatch PLA is from about 0.2% to about 1%.

4. The process of claim 1, wherein said 1-step in-mold annealing process comprises injection molding said polymer blend into a mold and producing an article, and maintaining said produced article in said mold at a temperature of from about 90° C. to about 110° C. and producing a high crystallinity article.

5. The process of claim 4, wherein the crystallinity of said article is greater than 40%.

6. The process of claim 2, wherein said 1-step in-mold annealing process comprises injection molding said polymer blend into a mold and producing an article, and maintaining said produced article in said mold at a temperature of from about 90° C. to about 110° C. and producing a high crystallinity article, and wherein the cycle time to produce said article is from about 20 to about 45 seconds with respect to a 5 gram molded article.

7. The process of claim 6, wherein said cycle time to produce said article is from about 25 to about 35 seconds with respect to a 5 gram article; and
    wherein the crystallinity of said article is at least about 45%.

8. The process of claim 3, wherein said 1-step in-mold annealing process comprises injection molding said polymer blend into a mold and producing an article, and maintaining said produced article in said mold at a temperature of from about 90° C. to about 110° C. and producing a high crystallinity article, wherein the cycle time to produce said article is from about 20 to about 45 seconds with respect to a 5 gram molded article.

9. The process of claim 8, wherein the cycle time to produce said article is from about 25 to about 30 seconds with respect to a 5 gram article, wherein the crystallinity of said article is at least about 50%.

10. The process of claim 5, including molding and annealing of said polymer blend to form a cutlery article.

11. The process of claim 9, including molding and annealing of said polymer blend to form a cutlery article.

12. The process of claim 10, wherein said crystallization aid compound comprises talc, and wherein said random copolyester is polybutylene succinate-co-adipate (PBSA), polybutylene sebacate-co-terephthalate (PBST), or polybutylene adipate-co-terephthalate (PBAT), or any combination thereof.

13. The process of claim 11, wherein said crystallization aid compound comprises talc, and wherein said random copolyester is polybutylene succinate-co-adipate (PBSA), polybutylene sebacate-co-terephthalate (PBST), or polybutylene adipate-co-terephthalate (PBAT), or any combination thereof.

14. A composition comprising:
   a) 100 parts by weight of a neat polylactide having a weight average molecular weight of from about 110,000 to about 175,000, said neat polylactide having a d (dextrorotatory) content of from about 0.2% to about 1.0%,
   b) from about 10 to about 100 parts by weight of a masterbatch, said masterbatch comprising from about 15 wt. % to about 50 wt. % of a polylactide, from about 30 wt. % to about 70 wt. % of a crystallization aid compound, and from about 5 wt. % to about 30 wt. % of a compostable random copolyester, said masterbatch polylactide having a d (dextrorotatory) content of from about 0.2% to about 2.5%, and said composition capable of being molded in a single step and having a crystallinity of at least 45%.

15. The composition of claim 14, wherein said neat polylactide resin has a weight average molecular weight of from about 115,000 to about 150,000, wherein said polylactide of said masterbatch has a weight average molecular weight of from about 115,000 to about 150,000, wherein said random copolyester of said masterbatch has a weight average molecular weight of from about 80,000 to about 175,000; said masterbatch comprising from about 15 wt. % to about 35 wt. % of said polylactide, from about 40 wt. % to about 60 wt. % of said crystallization aid compound, comprising a salt of a sulphonate, or a salt of a phosphonate, or a salt of a silicate, and from about 5 wt. % to about 25 wt. % of said compostable random copolyester, wherein the d-content of said neat polylactide is from about 0.2% to about 0.8%, and wherein the d-content of said masterbatch polylactide is from about 0.2% to about 2.0%.

16. The composition of claim 14, wherein said neat polylactide resin has a weight average molecular weight of from about 125,000 to about 140,000, wherein said polylactide of said masterbatch has a weight average molecular weight of from about 125,000 to about 140,000, wherein said random copolyester of said masterbatch has a weight average molecular weight of from about 90,000 to about 150,000; wherein the amount of said masterbatch from about 30 to about 40 parts by weight; wherein said masterbatch comprises from about 20 wt. % to about 30 wt. % of said polylactide, from about 50 wt. % to about 60 wt. % of said crystallization aid compound comprising talc, and from about 5 wt. % to about 20 wt. % of said compostable random copolyester; wherein the d-content of said neat polylactide is from about 0.2% to about 0.6%, and wherein the d-content of said masterbatch PLA is from about 0.2% to about 1%.

17. The composition of claim 14, wherein said composition is a molded cutlery article.

18. The composition of claim 17, wherein said molded cutlery article comprises a spoon, fork, or a knife, or a combination thereof.

19. The composition of claim 16, wherein said molded cutlery article comprises a spoon, fork, or a knife, or a combination thereof.

20. The composition of claim 19, wherein said molded cutlery article comprises a spoon, fork, or a knife, or a combination thereof.

* * * * *